(12) United States Patent
Hasegawa

(10) Patent No.: US 7,768,570 B2
(45) Date of Patent: Aug. 3, 2010

(54) IMAGE PICKUP APPARATUS USING AN IMAGING UNIT INCLUDING AN ETALON AND CALIBRATION METHOD THEREFOR

(75) Inventor: Akira Hasegawa, Musashino (JP)

(73) Assignee: Olympus Corporation, Tokyo (JP)

( * ) Notice: Subject to any disclaimer, the term of this patent is extended or adjusted under 35 U.S.C. 154(b) by 1074 days.

(21) Appl. No.: 11/113,123

(22) Filed: Apr. 25, 2005

(65) Prior Publication Data
US 2005/0237416 A1    Oct. 27, 2005

(30) Foreign Application Priority Data
Apr. 26, 2004    (JP)    ............... 2004-129782

(51) Int. Cl.
H04N 5/225    (2006.01)
H04N 17/00    (2006.01)
H04N 7/18    (2006.01)

(52) U.S. Cl. .................. 348/342; 348/65; 348/187

(58) Field of Classification Search .......... 348/65, 348/175, 176, 187, 188, 340, 342; 356/519; 359/578, 584, 589
See application file for complete search history.

(56) References Cited

U.S. PATENT DOCUMENTS

| | | | | |
|---|---|---|---|---|
| 4,345,271 A | * | 8/1982 | Sekiguchi | 348/175 |
| 5,303,165 A | * | 4/1994 | Ganz et al. | 356/319 |
| 5,528,295 A | * | 6/1996 | Wagner | 348/269 |
| 5,646,762 A | * | 7/1997 | Delavaux et al. | 398/180 |
| 6,046,014 A | * | 4/2000 | Lagarias et al. | 435/7.7 |
| 6,744,524 B1 | * | 6/2004 | Kogan et al. | 356/519 |
| 2001/0015810 A1 | * | 8/2001 | Hara et al. | 356/519 |
| 2003/0137672 A1 | * | 7/2003 | Moriya et al. | 356/519 |
| 2003/0164951 A1 | * | 9/2003 | Deck | 356/519 |
| 2004/0109167 A1 | * | 6/2004 | Sandstrom | 356/519 |
| 2005/0027166 A1 | * | 2/2005 | Matsumoto et al. | 600/162 |
| 2006/0244975 A1 | * | 11/2006 | VanBrocklin et al. | 356/519 |

FOREIGN PATENT DOCUMENTS

| | | | |
|---|---|---|---|
| JP | 63271308 A | * | 11/1988 |
| JP | S63-271308 A | | 11/1988 |
| JP | S63-271322 | | 11/1988 |

* cited by examiner

*Primary Examiner*—Timothy J Henn
(74) *Attorney, Agent, or Firm*—Arnold International; Bruce Y. Arnold

(57) ABSTRACT

An image pickup apparatus includes an objective optical system, an image pickup element having a surface at an image formed by the objective optical system, and an etalon positioned between the objective optical system and the surface of the image pickup element. The etalon includes a gap, an optical path length of which is controllable for scanning the wavelengths transmitted by the etalon to thereby select the wavelengths that reach the surface. An optical filter is positioned between the objective optical system and the surface and has a first wavelength range over which incident light is reflected, a second wavelength range over which incident light is transmitted, and a boundary wavelength range that is bounded by the first and second wavelength ranges. The boundary wavelength range lies entirely within the wavelength range the peak transmission of the etalon can be scanned. A method of calibrating the etalon is also disclosed.

4 Claims, 15 Drawing Sheets

IMAGE PICKUP APPARATUS USING AN IMAGING UNIT INCLUDING AN ETALON AND CALIBRATION METHOD THEREFOR

This application claims the benefit under 35 U.S.C. §119 of JP 2004-129782, filed Apr. 26, 2004, the contents of which are hereby incorporated by reference.

BACKGROUND OF THE INVENTION

In a known diagnosing method using an endoscope, fluorescent markers having an affinity to lesions, such as those resulting from cancer(s), are introduced into a subject's living tissue, the fluorescent markers are irradiated with excitation light, and fluorescence from the fluorescent markers that accumulate at lesions is detected. In order to improve the accuracy of diagnosis using such a diagnosing method, fluorescent markers are being used that emit specific spectral profiles and that have an affinity to multiple, different substances that appear while a cancer develops in a living tissue. The appearance of the multiple, different spectral profiles in the emission spectra of light emitted by the fluorescent markers is then detected.

For example, a prior art endoscope realizing such an observation technique as described above is disclosed in Japanese Laid Open Patent Application S63-271308, wherein an element having a variable light transmittance is provided in an image pickup unit. One element that is known to have a variable light transmittance is an etalon in which surfaces that have been made highly reflective are separated by a small gap, and the size of the gap is changed in order to select a wavelength that is transmitted by the etalon.

FIG. 17 is a schematic illustration of a prior art etalon. The etalon shown in FIG. 17 consists of two substrates 35X-1 and 35X-2 having reflective coatings 35Y-1 and 35Y-2, respectively, on their facing surfaces with a gap d between the reflective coatings 35Y-1 and 35Y-2. Light incident onto the substrate 35X-1 is subject to multiple beam interference due to the coatings 35Y-1 and 35Y-2. By changing the optical path length within the gap, such as by changing the width of the gap d, the light that emerges from the substrate 35X-2 changes in wavelength. For example, when the width of the gap d in FIG. 17 is changed from a value "a" to a value "b", the wavelength of maximum transmittance will change from Ta to Tb. The width of the gap can be changed, for example, by moving the substrates, such as by using a piezoelectric element.

FIG. 18 illustrates, for example, the spectral transmittance profile of the prior art etalon shown in FIG. 17, for the situations of the spacing d having a value "a" versus a value "b".

It is known that a small etalon may be produced by surface micro-machining, and in which the width of a gap may be changed using electrostatic forces.

FIG. 19 schematically illustrates the structure of such a small etalon. The small etalon in FIG. 19 is provided with facing mirrors 35' X-1 and 35' X-2 having a high reflectance. Metal coatings or dielectric multilayer coatings are laminated on the facing surfaces of the mirrors 35' X-1 and 35' X-2. The mirror 35' X-1 is coupled at its outer periphery to an elastically deformable hinge 35' Z-1. The mirror 35' X-2 is fixed at its outer periphery to a substrate 35' Y-2. The hinge 35' Z-1 and the substrate 35' Y-2 are spaced from each other and coupled at their outer periphery to spacers 35'a, 35'a. In the small etalon in FIG. 19, a microactuator (not illustrated) is used to create an electrostatic force between the facing mirrors 35' X-1 and 35' X-2 in order to elastically deform the hinge 35' Z-1, thereby changing the width of a gap d between the mirrors 35' X-1 and 35' X-2. With the width of the gap d being changed, light of a different wavelength is transmitted by the small etalon.

The etalon has a peak transmittance at a wavelength $\lambda$ when the optical path length of the gap d satisfies the following Condition (1):

$$d = (\lambda/2) \cdot n \text{ (n is an integer)} \qquad \text{Condition (1).}$$

It is understood from Condition (1) above that the peak transmittance wavelength $\lambda$ shifts as the gap d is changed. Since the peak transmittance wavelength shifts as the gap is changed, the peak transmittance wavelength can be readily determined for a given gap d, and vice-versa.

In a fluorescent observation described above using an image pickup unit having an etalon, the gap is controlled based on a reference gap d0, and the peak transmittance wavelength is scanned to detect the fluorescence emitted by multiple fluorescent dyes that emit different spectral profiles within a range of wavelengths scanned by the etalon. Thus, it can be readily determined which fluorescent dye(s) is(are) producing the emitted fluorescence.

In an image pickup apparatus using an image pickup unit having an etalon, multiple images can be captured at a high speed using light having different wavelengths, and the image information may be analyzed, for example, to diagnose a cancer that has developed in living tissue but is difficult to detect by other means in its early stage.

Etalons have different operational accuracies that result from production errors. Therefore, an image pickup unit having an etalon and an image pickup apparatus using such an image pickup unit needs to be individually calibrated, based on a reference gap, for operational accuracy.

Further, in an image pickup unit having an etalon and in an image pickup apparatus using such an image pickup unit, the etalon will be influenced by the work environment. Therefore, the etalon is subject to changes in operational accuracy. For example, when an image pickup unit having an etalon is provided in an endoscope at the insertion end, the etalon exhibits different scanning performance before versus after the insertion end reaches the site to be examined. This presumably occurs because the temperature of the endoscope insertion end changes upon the endoscope end being inserted at the examination site. Therefore, it is desirable to set the etalon for a reference gap (i.e., to calibrate it for operational accuracy), after the endoscope insertion end has been inserted and immediately before the peak transmission wavelength of the etalon is actually scanned.

The above-mentioned Japanese Laid Open Patent Application S63-271308 fails to disclose any means or method for resolving these problems.

BRIEF SUMMARY OF THE INVENTION

The present invention relates to a means and a method for calibrating an etalon for operational accuracy in an image pickup apparatus using an image pickup unit having an etalon. It is an objective of the present invention to resolve the problems referred to above and to provide a means and a method, in an image pickup apparatus using an image pickup unit having an etalon, for calibrating the etalon for operational accuracy.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 5(a) shows a structure of an endoscope having an image pickup unit provided in the endoscope insertion end of the endoscope and two etalons ET1 and ET2, and FIG. 5(b) shows a structure of an endoscope having an image pickup unit provided in the operation part of the endoscope and two etalons ET1 and ET2;

DETAILED DESCRIPTION

The present invention relates to an endoscope apparatus that uses an image pickup unit having an etalon.

Figure 1:
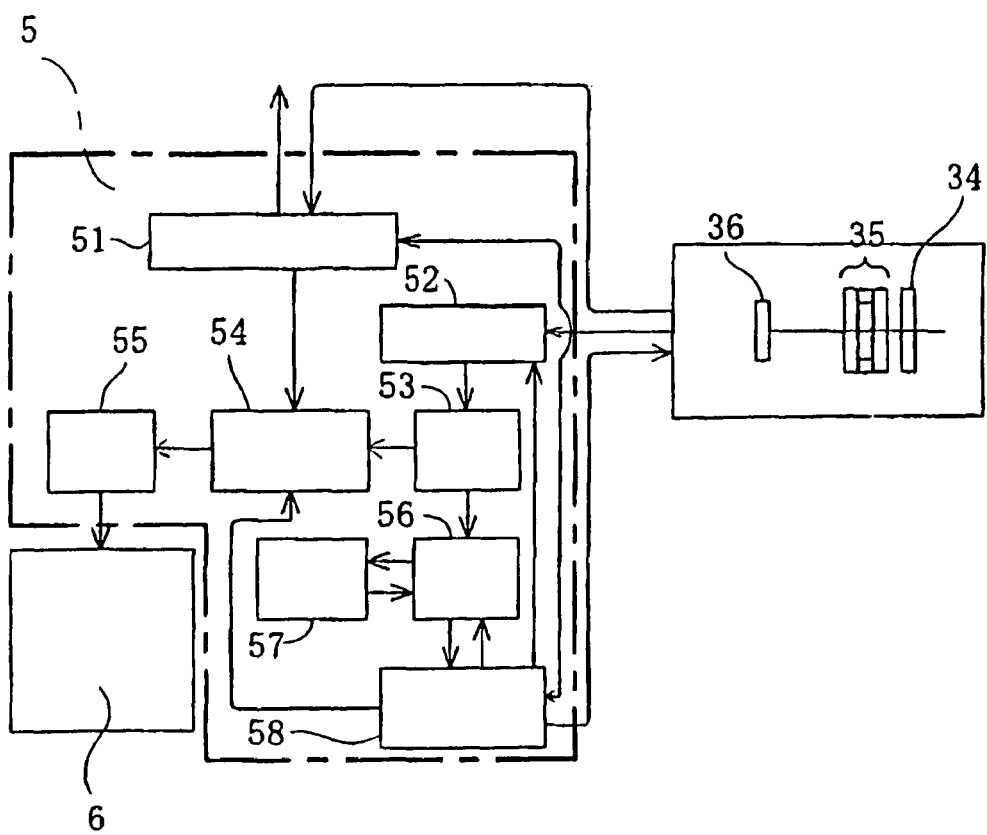
FIG. 1 is a block diagram showing the functional components used in setting a reference gap of an etalon for use in an endoscope apparatus.

FIG. 1 is a block diagram showing a structure for calibrating an endoscope apparatus using an optical member 34 for setting a reference gap. The structure includes optical member 34 that is located on the object side of an etalon 35 and a light reception part 36 that is located on the image side of the etalon 35 in an image pickup unit, a processor 5 for controlling the operation of the etalon and executing arithmetic operations relating to setting a reference gap, and a monitor 6 for displaying images captured by the image pickup unit as well as for displaying the result of setting a reference gap.

Figure 2:
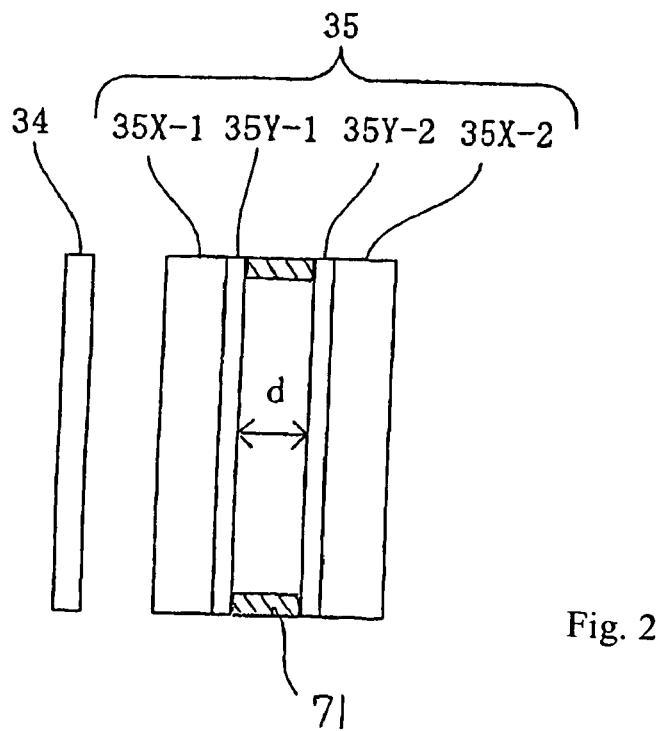
FIG. 2 is an enlarged illustration of the optical member 34 that is used to set a reference gap and the etalon 35 shown in FIG. 1.

FIG. 2 is an enlarged illustration of the optical member 34 that is used in setting a reference gap and the etalon 35. The etalon 35 includes a driving means, such as a piezoelectric element 71, for changing the gap d between facing reflective mirrors. By changing the voltage applied to the piezoelectric element 71, the optical path length of the gap d can be made to increase or decrease.

Figure 3A:
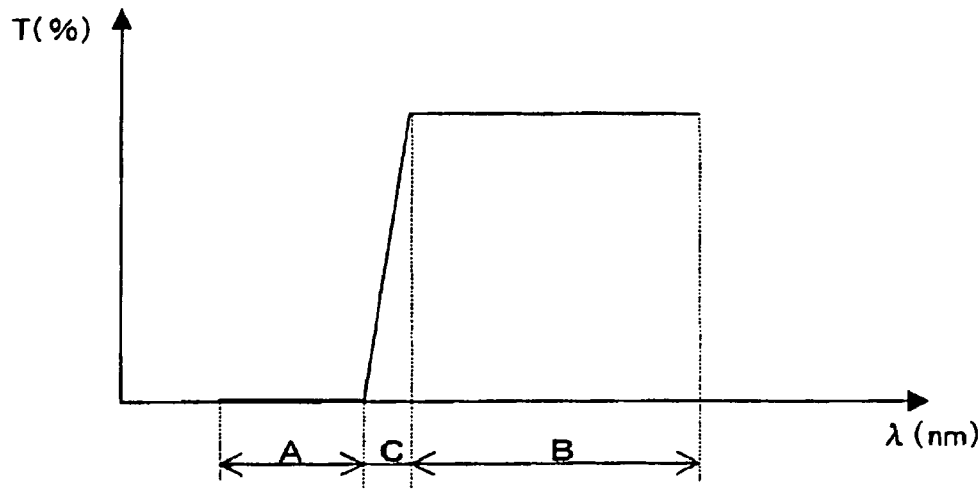
FIGS. 3(a)-3(c) show optical properties of an image pickup unit having an etalon, with FIGS. 3(a) and 3(b) showing the spectral transmittances of the optical member 34 and the etalon 35, respectively, and with FIG. 3(c) showing, in arbitrary units, the intensity of light received by the light reception part 36 of the image pickup unit.
Figure 3B:
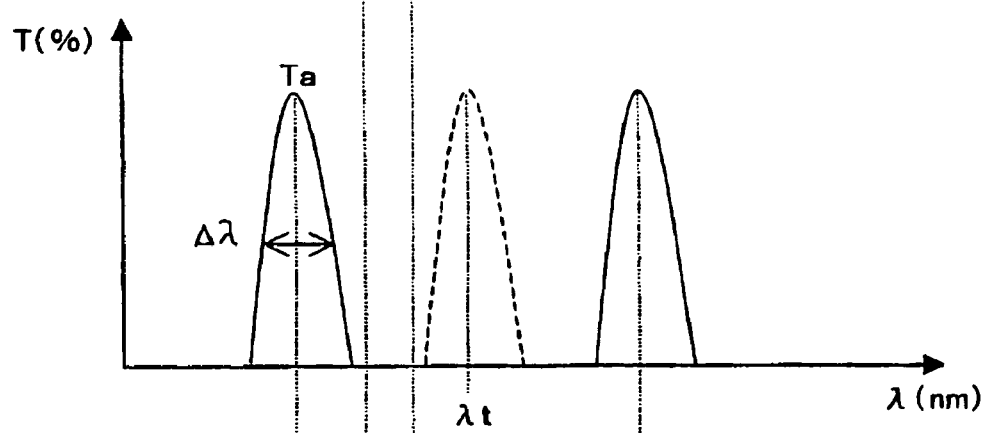
Figure 3C:
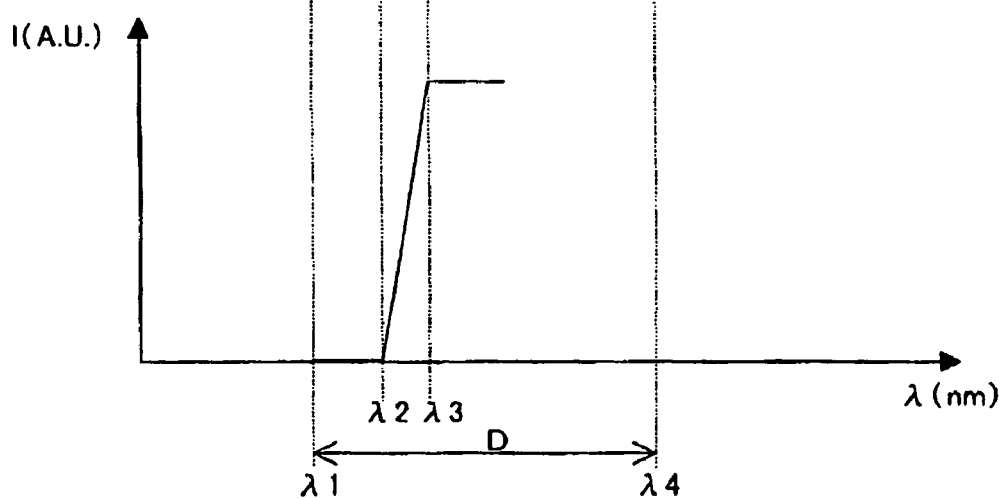

FIGS. 3(a)-3(c) show optical properties of an image pickup unit having an etalon, with FIGS. 3(a) and 3(b) showing the spectral transmittances of optical member 34 that is used to set a reference gap and the etalon 35, respectively, and with FIG. 3(c) showing, in arbitrary units, the intensity of light received by the light reception part 36 of the image pickup unit. The optical member 34 is, for example, an optical filter that transmits light in a desired range of wavelengths. Referring to FIG. 3(a), the optical filter may be reflective of light in a wavelength range A and transmissive of light in a wavelength range B. Referring to FIG. 3(b), a wavelength range D over which the maximum transmission of the etalon 35 can be scanned by changing the optical path length of the gap includes the entirety of the wavelength range C (shown in FIG. 3(a)) that is bounded on the short-wavelength side by the wavelength range A and bounded on the long-wavelength side by the wavelength range B. Light transmitted through the optical member 34 and the etalon 35 is received by the light reception part 36. The light reception part 36 includes, for example, an image pickup element, such as a CCD, that detects the intensity of the light incident thereon.

It is assumed that a light source having an even luminescence emission intensity in the wavelength range D may be scanned by the etalon 35 by changing the etalon's peak transmittance from short to long wavelengths, and that the image pickup unit repeatedly captures images of the light source as the optical path length of the gap of the etalon 35 is changed. The intensity of light received by the light reception part 36 depends both on the transmittance of the optical member 34 and the etalon 35, since the light that is received at the light reception part must first pass through these members. As shown in FIG. 3(a), the transmittance of the optical member 34 rapidly increases with increasing wavelength in the wavelength region C. Thus, as shown in FIG. 3(c), the light received by the light reception part 36 will abruptly increase with wavelength within the wavelength region C as the peak transmittance of the etalon 35 passes through the wavelength range C (herein sometimes referred to as 'boundary wavelength range C'—which begins at a wavelength $\lambda 2$ and continues to a longer wavelength $\lambda 3$), while the peak transmittance of the etalon is scanned within the wavelength range D which begins at a $\lambda 1$ that is shorter than the wavelength $\lambda 2$ and continues to a wavelength $\lambda 4$ that is longer than the wavelength $\lambda 3$.

When the following Condition (2) is satisfied, the wavelength range over which the intensity of light received by the light reception part 36 changes (i.e., the mathematical convolution of the graphs shown in FIG. 3(a) and FIG. (3(b)) will roughly coincide with the boundary wavelength range C of the optical member 34.

$$\Delta\lambda 2 < |\lambda 3 - \lambda 2| \qquad \text{Condition (2)}$$

where $\Delta\lambda$ is the full width at half-maximum of the peak transmittance of a graph of the spectral transmittance of the etalon 35;

$\lambda 3$ is the long wavelength boundary of the boundary wavelength range C; and $\lambda 2$ is the short wavelength boundary of the boundary wavelength range C.

Ideally, $\Delta\lambda$ is much smaller that the absolute value of $\lambda 3 - \lambda 2$.

As shown in FIG. 3(c), the wavelength at which the received light intensity starts to change will roughly coincide with the wavelength $\lambda 2$, the short-wavelength boundary of the boundary wavelength range C shown in FIG. 3(a). Furthermore, as shown in FIG. 3(c), the wavelength at which the received light intensity ceases changing will roughly coincide with the wavelength $\lambda 3$, the long-wavelength boundary of the boundary wavelength range C shown in FIG. 3(a).

For example, a gap control voltage V2 (not illustrated) of an etalon 35 may be recorded at the wavelength $\lambda 2$ at which the received light intensity starts to change. Thus, the gap control voltage will have an initial value of V2 that sets the etalon 35 for a reference gap when the etalon starts to scan the peak transmittance wavelength. In conjunction with this, the gap control voltage V2 for the etalon 35 at the wavelength $\lambda 2$ at which received light intensity starts to change and the gap control voltage V3 for the etalon 35 at the wavelength $\lambda 3$ at which the received light intensity ceases changing may be recorded as data in an arithmetic operation processing circuit 57 of the processor 5. These data may then be used to execute calculations necessary to calibrate the etalon for operational accuracy, such as the change rate of the gap control voltage per unit wavelength.

A control circuit for the etalon 35 is constructed that calculates the gap control voltage necessary to obtain a desired peak transmittance wavelength, based on the change rates in the gap control voltage per unit wavelength, and that then applies the calculated voltage to the driving means of the etalon 35. In this way, a desired peak transmittance wavelength can be selected. To do so, it is preferable that the processor 5 be provided with a memory circuit 56 for storing and reading measurements and for calculating the results of the measurements.

The wavelengths $\lambda 2$ and $\lambda 3$ can be determined on an arbitrary basis under the above conditions in the course of producing the optical member 34 that is used to set a reference gap. It is preferable that the wavelengths $\lambda 2$ and $\lambda 3$ do not change even though the optical member 34 may be subjected to temperature changes within the range of 0°-150° C. For example, where an interference-coating, laminated-type, optical filter is used, it is preferable to use an optical filter produced by ion assisted coating or ion plating using an ion gun. These coating techniques result in increasing the bonding strength of the coating substances, thereby preventing a space from being created between the coatings. Therefore, an optical filter having a stable spectral transmittance profile can be obtained regardless of the temperature of the coating.

Figure 4A:
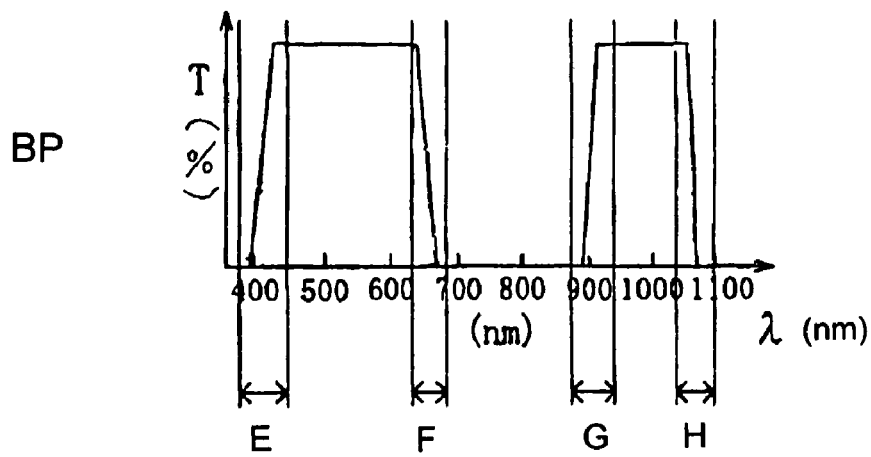
FIGS. 4(a)-4(c) show the spectral transmittance of components of the optical member 34 that is used to set a reference gap, with FIG. 4(a) illustrating the spectral transmittance of an optical bandpass filter BP having multiple pass bands, with FIG. 4(b) illustrating the spectral transmittance of a long wavelength pass filter LWP having a boundary wavelength range G1 where the spectral transmittance varies with wavelength, and with FIG. 4(c) illustrating the spectral transmittance of a short wavelength pass filter SWP having a boundary wavelength range H1 where the spectral transmittance varies with wavelength.
Figure 4B:
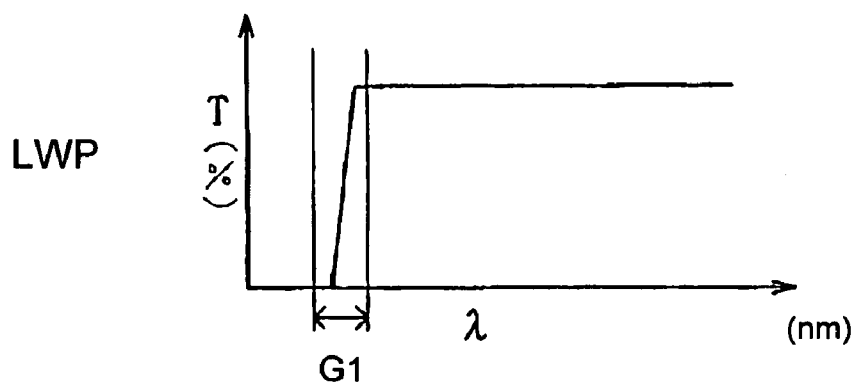
Figure 4C:
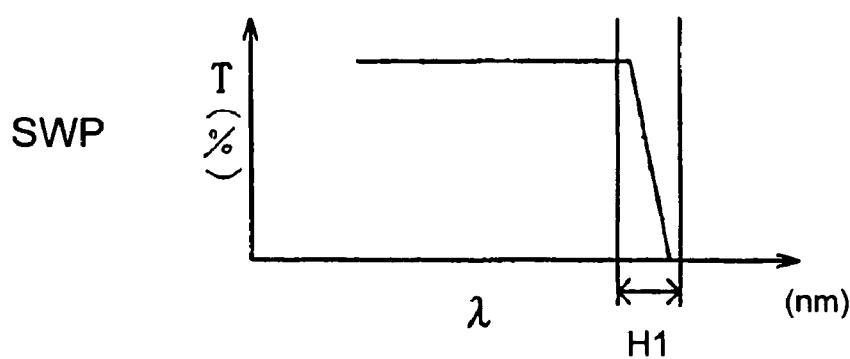

FIGS. 4(a)-4(c) show the spectral transmittance of components of the optical member 34 that is used to set a reference gap, by way of example. In these figures, transmittance (in %) is plotted on the ordinate versus wavelength (in nm) on the abscissa. In the example of FIG. 4(a), the optical member 34 is a bandpass optical filter BP having multiple band passes in specified wavelength ranges. FIG. 4(b) illustrates the spectral transmittance of a long wavelength pass filter LWP having a boundary wavelength range G1 where the spectral transmittance varies with wavelength, and FIG. 4(c) illustrates the spectral transmittance of a short wavelength pass filter SWP having a boundary wavelength range H1 where the spectral transmittance varies with wavelength. More specifically, within the wavelength range 350-1100 nm, the bandpass filter transmits wavelengths of 400-680 nm within the visible range and wavelengths of 880-1080 nm within the infrared range. In an image pickup unit having a bandpass filter having such characteristics and an etalon, at least one of the wavelength ranges E, F, G, or H (which are boundary wavelength ranges, as shown in FIG. 4(a)) is included within the wavelength range scanned by the etalon. For example, if the etalon scans a wavelength range in the range 850-1100 nm, the boundary wavelength range G or H can be used to set the etalon for a reference gap.

As shown in FIG. 1, the processor 5 includes a first control circuit 51 for detecting the type of image pickup unit and for controlling the operation of the light source, a pre-processing circuit 52 for adjusting the gain of analog signals sent from the image pickup unit, an A/D converter 53 for converting analog signals to digital signals, an image signal processing circuit 54 for processing images, a D/A converter 55 for converting digital signals to analog signals, the memory circuit 56 for storing and reading data, the arithmetic operation circuit 57 for executing arithmetic operations to control the movement of the etalon 35 based on data stored in the memory circuit 56, and a second control circuit 58 for controlling the operation relating to image acquisition of the image pickup unit.

When the image pickup unit is coupled to the processor 5, the first control circuit 51 detects information on the type of the etalon 35 in the image pickup unit and the presence or absence of the optical member 34 used to calibrate the etalon 35. The first control circuit 51 then optimizes the operational settings of a light source apparatus (not illustrated) and the second control circuit 58 for the image pickup unit. In addition, the first control circuit 51 serves to synchronize the timing of the light source apparatus that illuminates an object with the timing of the image pickup unit that captures images when the etalon 35 is calibrated for operational accuracy.

The second control circuit 58 sends signals to the first control circuit 51 and to the pre-processing circuit 52 for controlling the magnitude of a voltage for operating the etalon 35 and for adjusting the image acquisition timing of the image pickup unit, based on the latest calibration value obtained by calibration of the etalon 35.

The pre-processing circuit 52 adjusts the gain of image signals input from the image pickup element 36 and color balance based on control signals from the second control circuit 58. Analog image signals output from the pre-processing circuit 52 are converted to digital signals by the A/D converter 53. The image signal processing circuit 54 executes image processing of image signals converted to digital signals, such as partially enhanced images, so as to remove noise, merge images, plot images and display marks and character information at any coordinate point of an image display. Digital signals output from the image signal processing circuit 54 are converted to analog signals by the D/A converter 55. The first control circuit 51 and the second control circuit 58 can be integrated into one control circuit having the function of both circuits.

It is assumed that an object having a uniform spectral reflectance within the wavelength range 850-1100 nm is illuminated by illumination light having wavelengths in the same range. An image of the object is captured by the above-described image pickup unit. Processor 5 controls the gap of the etalon in order to scan the peak transmittance wavelength of the etalon. The intensity of light received by the light reception surface of the image pickup element abruptly changes in accordance with the spectral transmittance of the etalon in the boundary wavelength ranges G and H. The voltages applied to the etalon when the received light intensity is maximized and minimized are stored in a predetermined memory region of the memory circuit 56 within the processor 5, along with the associated peak transmittance wavelengths. The arithmetic operation circuit 57 reads data stored in the memory circuit 56 and calculates values necessary to control the gap of the etalon, such as change rates in the peak transmission wavelength corresponding to change rates in the applied voltage, and the calculated numerical data is stored in another region of the memory circuit 56.

If the etalon mounted in the image pickup unit described above not only scans the peak transmittance wavelength in the wavelength range 850-1100 nm, but also has an average transmittance of 50% or higher in a wavelength range 400-680 nm and has a nearly uniform transmittance regardless of changes in the gap, an image pickup unit can be provided that serves both for color image observation using visible light and for selective detection using near-infrared light of a desired wavelength.

An etalon ET1 that may be used to scan the peak transmittance wavelength in the near-infrared range and an etalon ET2 that may be used to scan the peak transmittance wavelength in the visible range can be arranged in series in the optical path of the image pickup unit, thereby enabling the scanning of the peak transmittance wavelength both in the near-infrared range and in the visible range.

FIG. 5(*a*) shows the structure of an endoscope apparatus in which an image pickup unit having the etalons ET1 and ET2 is provided at the endoscope insertion end of the endoscope apparatus. In this case, it is preferable that the surfaces forming the gap of one etalon ET1 have a transmittance of 50% or lower for a specified wavelength range and the surfaces forming the gap of the other etalon ET2 have a transmittance of 50% or higher for the same specified wavelength range.

Figure 6A:
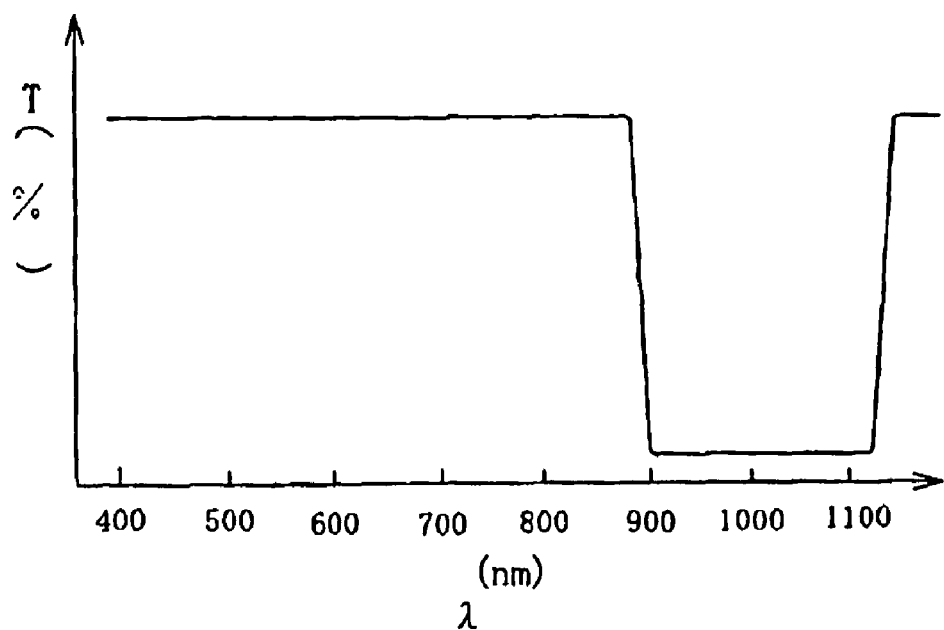
FIGS. 6(a) and 6(b) show the optical characteristics of the etalon ET1, with FIG. 6(a) illustrating the spectral transmittance of the surfaces that form the gap, and with FIG. 6(b) illustrating the spectral transmittance of the etalon ET1 when the gap is changed.
Figure 6B:
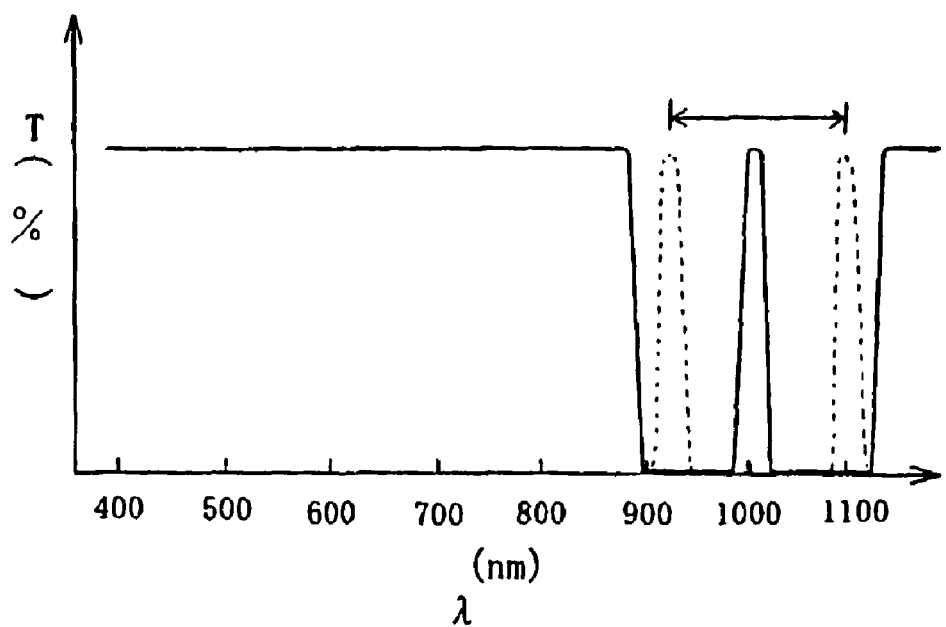

FIGS. 6(*a*) and 6(*b*) show the optical characteristics of the etalon ET1, that scans the peak transmittance wavelength in the near-infrared range, with FIG. 6(*a*) illustrating the spectral transmittance of the surfaces that form the gap, and with FIG. 6(*b*) illustrating the spectral transmittance of the etalon ET1 when the optical path length of the gap is changed. In each figure, transmission T (in %) is plotted on the ordinate and wavelength λ (in nm) is plotted on the abscissa. Although no numerals are listed on the ordinate axis, the transmittance of the surfaces forming the gap of the etalon ET1 is 50% or lower in the wavelength range 900-1130 nm and 50% or higher in the wavelength range 400-850 nm. Consequently, the etalon ET1 can scan the peak transmittance wavelength using multiple beam interference in the wavelength range 930-1100 nm. Furthermore, light is always transmitted in the wavelength range 400-850 nm regardless of changes in the optical path length within the gap.

Figure 7A:
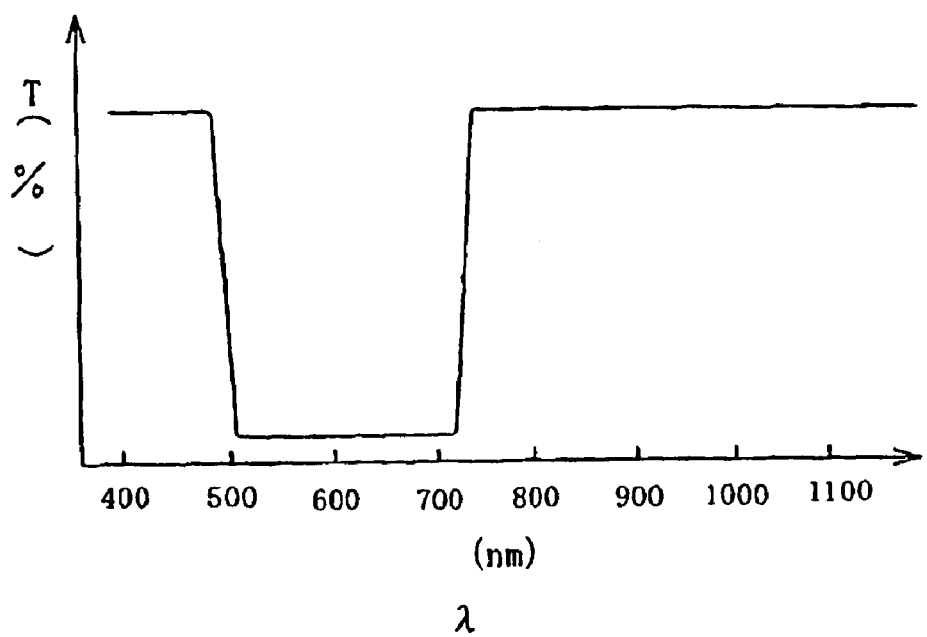
FIGS. 7(a) and 7(b) show the optical characteristics of the etalon ET2, with FIG. 7(a) illustrating the spectral transmittance of the surfaces that form the gap, and with FIG. 7(b) illustrating the spectral transmittance of the etalon ET2 when the gap is changed.
Figure 7B:
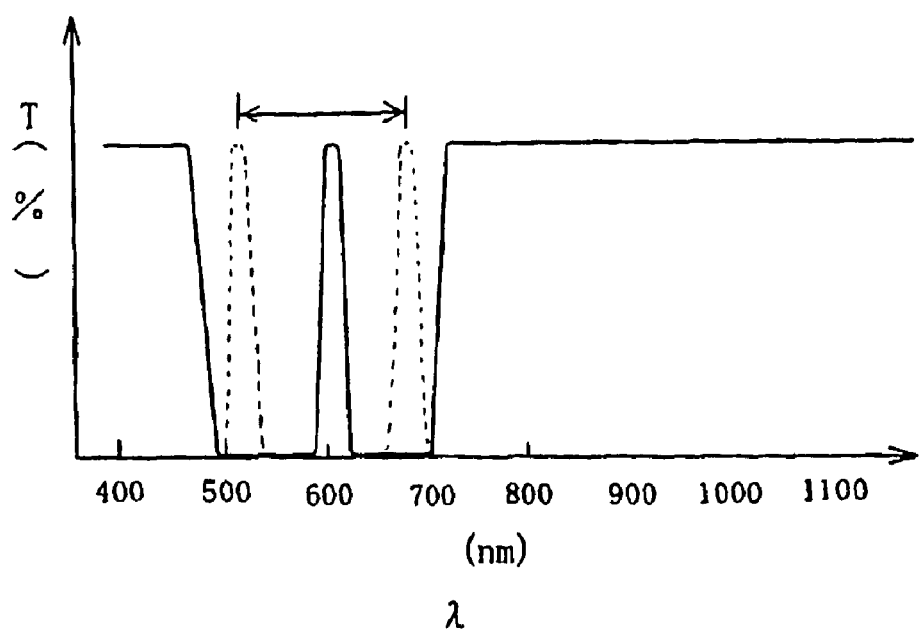

FIGS. 7(*a*) and 7(*b*) show the optical characteristics of the etalon ET2 of FIG. 5(*a*) that scans the peak transmittance wavelength in the visible range, with FIG. 7(*a*) illustrating the spectral transmittance of the surfaces that form the gap, and with FIG. 7(*b*) illustrating the spectral transmittance of the etalon ET2 when the gap is changed. In each figure, percent transmission is plotted on the ordinate and wavelength is plotted on the abscissa. Although no numerals are listed on the ordinate axis, the transmittance of the surfaces forming the gap of the etalon ET2 is 50% or lower in the wavelength range 500-710 nm, and 50% or higher in the wavelength range 760-1100 nm. Consequently, the etalon ET2 can scan the peak transmittance wavelength using multiple beam interference in a wavelength range 530-680 nm. Furthermore, regardless of changes in the optical path length within the gap, light is always transmitted in the wavelength range 760-1100 nm.

Figure 8:
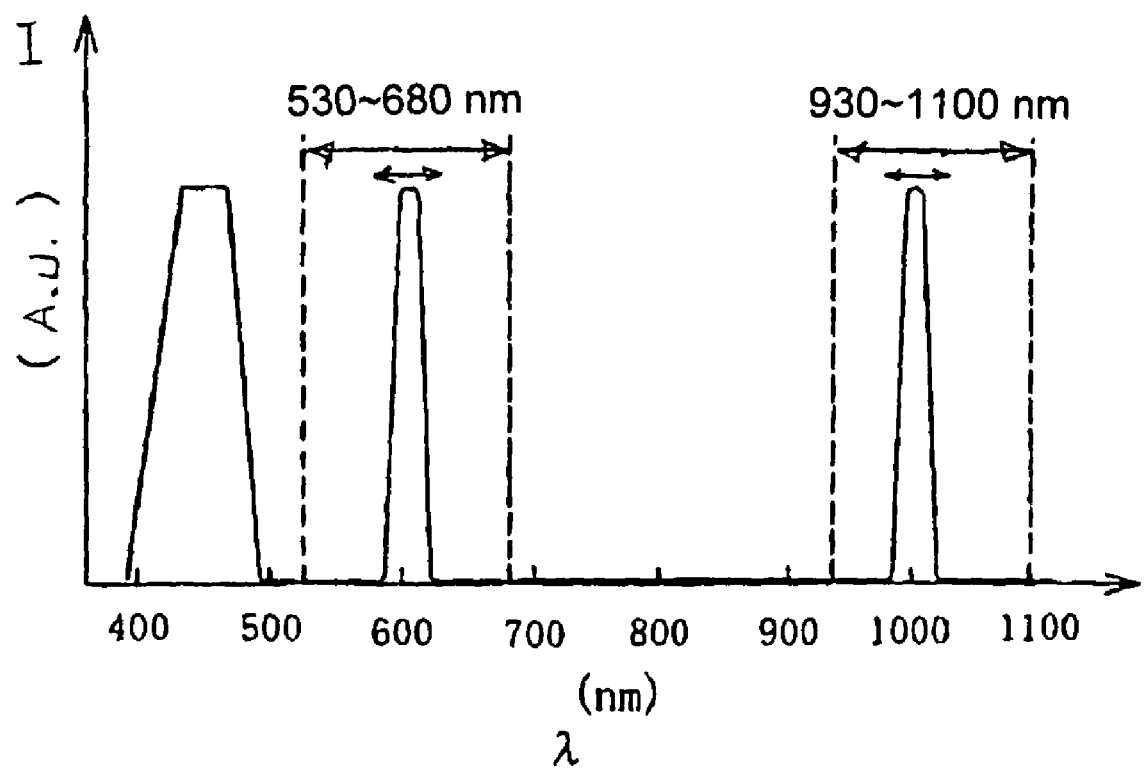
FIG. 8 shows the intensity of light received (in arbitrary units) by a light reception surface of the image pickup element when a light source having an even luminescence intensity in a wavelength range of 400-1100 nm is observed using the endoscope apparatus shown in FIG. 5(a)

FIG. 8 shows the intensity of light received (in arbitrary units) by a light reception surface of the image pickup element when a light source having an even luminescence intensity in a wavelength range 400-1100 nm is observed using the endoscope apparatus shown in FIG. 5(*a*) equipped with an image pickup unit in which the etalons ET1 and ET2 are arranged in series. In the figure, received light intensity is plotted (in arbitrary units) on the ordinate and wavelength (in nm) is plotted on the abscissa. The reference gap setting member is an optical filter having the spectral transmittance shown in FIG. 4(*a*).

An endoscope having the above-described image pickup unit at the insertion end can selectively detect light of a desired wavelength in the wavelength ranges 930-1100 nm and 530-680 nm.

A boundary wavelength range H having the spectral transmittance profile shown in FIG. 4(*a*) is used to set the etalon ET1 for a reference gap. The insertion end of the endoscope is inserted into a barrel having a reflecting surface and illumination light having wavelengths in the same wavelength range as the wavelength range H is used to illuminate the reflecting surface. Illumination light having wavelengths within the same range as the wavelength range H is emitted by an illumination optical system of the endoscope.

The illumination optical system is formed of a light source apparatus 2 (FIG. 5(*a*)) that includes a xenon lamp that emits light in the visible to near-infrared wavelength range, a collection optical system for collecting light emitted from the xenon lamp at the entrance end of a light guide, and multiple transmission wavelength selective filters removably arranged in the optical path between the xenon lamp and the entrance end of the light guide, and an illumination lens provided at the endoscope insertion end for illuminating an object with light emerging from the exit end of the light guide.

Figure 5A:
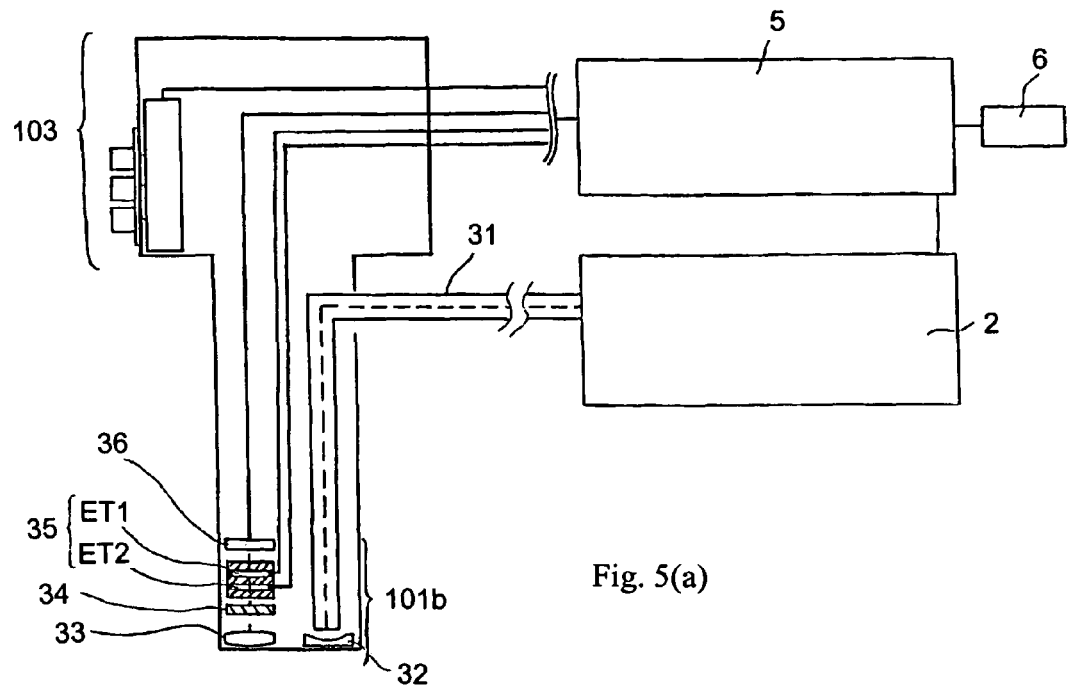
FIGS. 5(a) and 5(b) illustrate structures of endoscope apparatuses that use an image pickup unit having an optical member 34 for setting a reference gap and an etalon 35.
Figure 9:
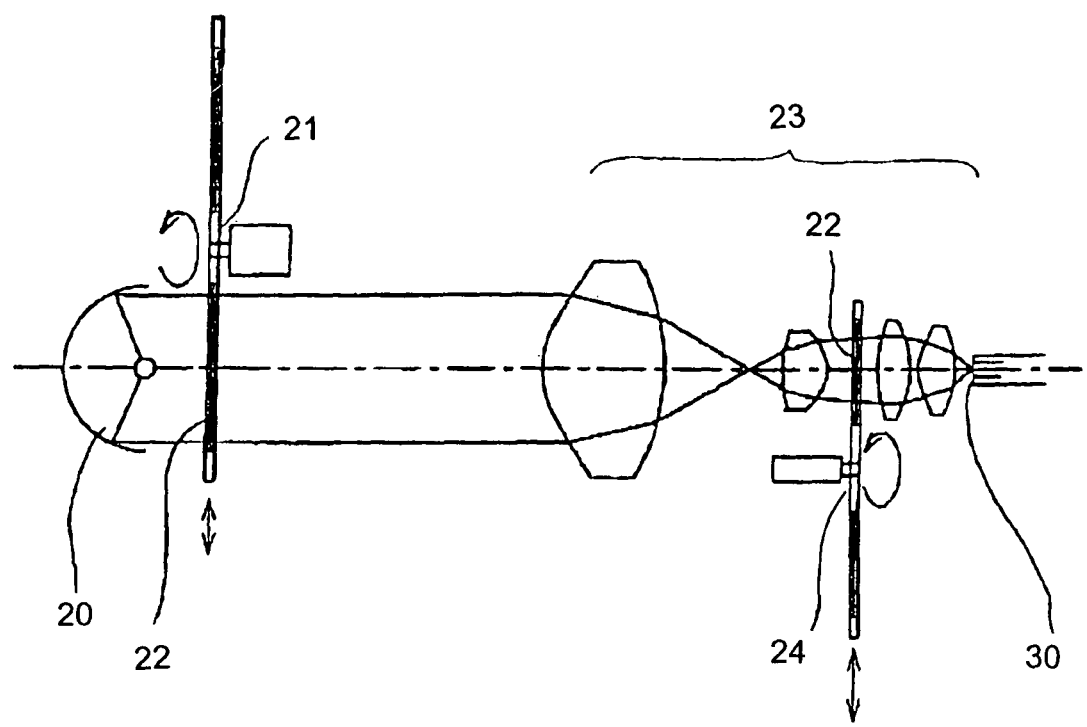
FIG. 9 shows the structure of a light source apparatus.
Figure 10:
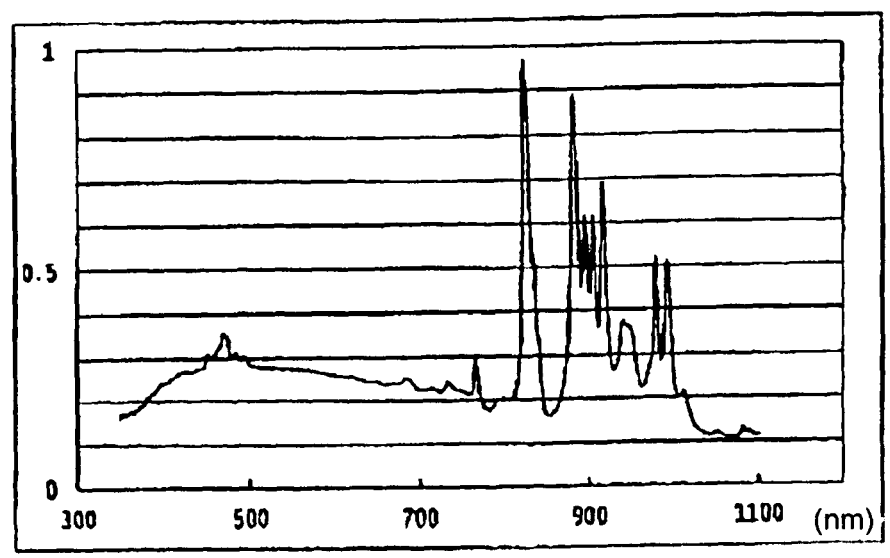
FIG. 10 is a graph of the luminescence intensity versus wavelength of light emitted by a xenon lamp used in the light source apparatus shown in FIG. 9.

FIG. 9 shows the structure of the light source apparatus 2 (FIG. 5(a)). Lamp 20 is an electric discharge xenon lamp. The spectral content of the light produced by the xenon lamp has a relatively even profile in the visible range, as shown in FIG. 10. In addition, the xenon lamp has a sufficient intensity in the near-infrared range. Therefore, a xenon lamp is the most suitable lamp available for general color image observation using light in the visible range and in the near-infrared range, as in the present invention.

In order to select multiple illumination lights having different wavelengths, both the turret 21 and the rotary disk 24 are provided with optical filters that can be removably placed in the optical path of the light source apparatus between the lamp 20 and the entrance end 30 of the light guide for the endoscope. Also, both the turret 21 and the rotary disk 24 can be moved within planes that are perpendicular to the optical axis of the collection optical system 23. Each of the turret 21 and the rotary disk 24 rotates about rotation axes that are parallel to the optical axis of the light source apparatus, so that various optical filters 22 can be inserted into the light flux emitted from the lamp 20 and collected at the entrance end 30 of the light guide of the endoscope.

Figure 11A:
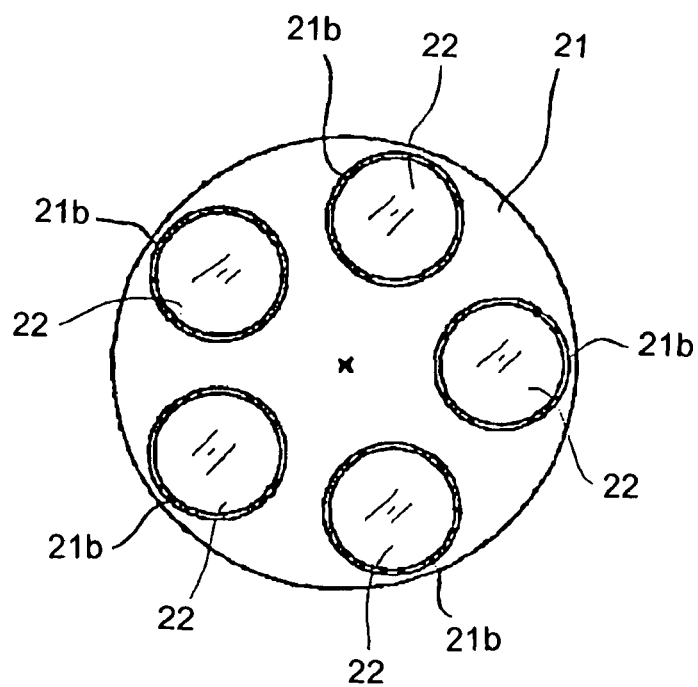
FIGS. 11(a)-11(c) show structures of a turret and rotary disk that are provided in the light source apparatus shown in FIG. 9, with FIG. 11(a) being a front view of the turret, with FIG. 11(b) being a side view of the turret, and with FIG. 11(c) being a front view of the rotary disk.
Figure 11B:
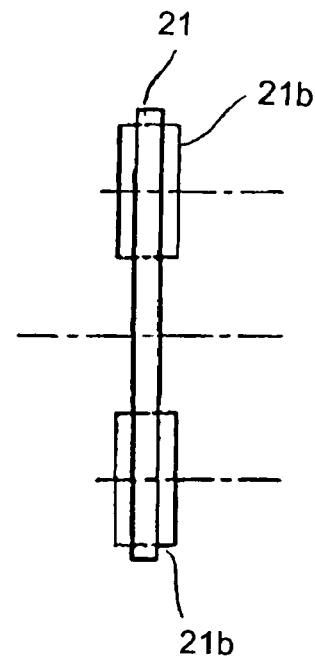
Figure 11C:
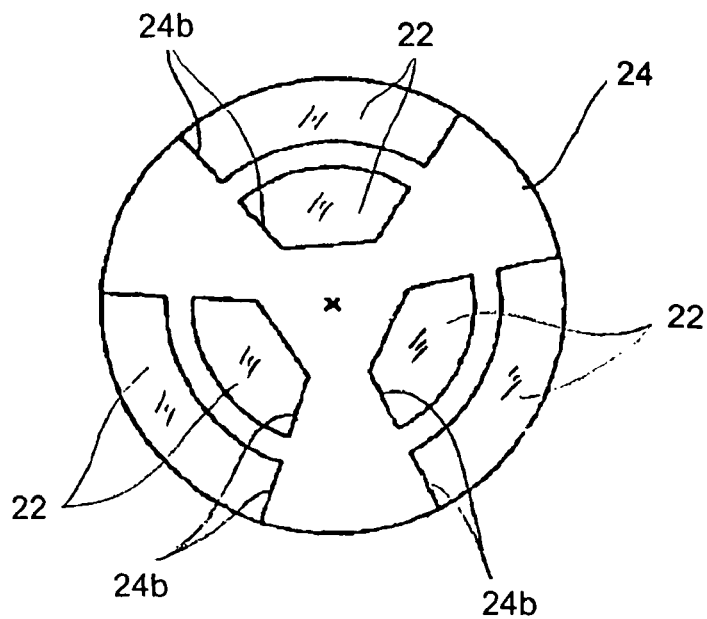

FIGS. 11(a)-11(c) show structures of a turret and rotary disk that are provided in the light source apparatus, with FIG. 11(a) being a front view of the turret 21, with FIG. 11(b) being a side view of the turret 21, and with FIG. 11(c) being a front view of the rotary disk 24. Referring to FIG. 11(a), the turret 21 has at least five filter holders 21b positioned on its substrate concentrically about a rotation axis. One or more optical filters 22 are housed in the filter holders 21b. FIG. 11(b) is a side view of the turret 21. The turret 21 rotates about the rotation axis, whereby the optical filters 22 housed in the filter holders 21b may be removably inserted and held fixed in the optical path.

Referring to FIG. 11(c), the rotary disk 24 has outer and inner windows 24b provided on its substrate about a rotation axis. The optical filters 22 are attached to the windows 24b. The rotary disk 24 rotates about the rotational axis x at a fixed rotation speed, and can be moved in a plane that is substantially perpendicular to the optical axis of the collection optical system 23 by means of a rotary disk moving mechanism (not illustrated). By moving the rotary disk 24 to a proper position, the following three illumination modes can be provided.

Illumination Mode 1

A series of optical filters 22 that are positioned near the outer periphery of the rotary disk 24 and that may be substantially identical in spectral transmittance are inserted into the optical path, in turn, for repeated illumination.

Illumination Mode 2

A series of optical filters 22 that are positioned near the inner periphery of the rotary disk 24 and that may be substantially identical in spectral transmittance (but which differ from the spectral transmittance of the optical filters 22 that are positioned near the outer periphery of the rotary disk 24) are inserted into the optical path, in turn, for repeated illumination.

Illumination Mode 3

The rotary disk 24 may be withdrawn entirely from the optical path. Accordingly, provided that the turret 21 has five optical filters 22, each having a different transmittance profile, 15 different possible illuminations are available using, in combination, the turret 21 and the rotary disk 24 (i.e., the rotary disk has 3 positions, namely, either one of two different filters in the optical path or complete withdrawal from the optical path).

For setting the etalon ET1 to a reference gap, a transmission wavelength selection filter 22 that transmits light in the same wavelength range as the boundary wavelength range H is inserted into the optical path of the collection optical system 23. Then, an image of the inside of the barrel is captured by the image pickup unit and the gap of the etalon ET1 is changed to scan the peak transmittance wavelength from the longer wavelength side to the shorter wavelength side, thereby obtaining a graph of the intensity versus wavelength of the light received by the light reception surface of the image pickup element 36. The intensity of light received by the light reception surface of the image pickup element 36 abruptly changes with wavelength in accordance with the spectral transmittance of the etalon ET1 in the wavelength range H. The gap change rate per unit wavelength when the intensity of light received is changed from maximum intensity to minimum intensity is calculated in order to correct the etalon operation and thus calibrate the etalon ET1 for scanning accuracy. An initial value of the gap control voltage is obtained based on the voltage applied to control the etalon operation while the intensity of light received is recorded and processed, thereby setting the etalon ET1 to a reference gap.

For setting the etalon ET2 to a reference gap, use is made of the wavelength range F, having a spectral transmittance as shown in FIG. 4(a). The insertion end of the endoscope is inserted in a barrel having a reflecting surface and is illuminated by illumination light having wavelengths in the same wavelength range as the wavelength range F emitted by the illumination optical system of the endoscope. A transmission wavelength selection filter 22 that transmits light in the same wavelengths as the wavelength range F is selectively inserted into the optical path of the collection optical system 23 for collecting light emitted from the xenon lamp 20 onto the entrance end 30 of the light guide. An image of the inside of the barrel is captured by the image pickup unit while the gap of the etalon ET2 is changed in order to scan the peak transmittance wavelengths from long to short wavelengths, thereby recording the intensity of light received by the light reception surface of the image pickup element 36. The intensity of light received by the light reception surface of the image pickup element 36 abruptly changes in accordance with the spectral transmittance of the etalon ET2 in the wavelength range F, which is a boundary wavelength range. The gap change rate per unit wavelength from maximum to minimum intensity of light received is calculated to correct the etalon operation and thus calibrate the etalon ET2 for scanning accuracy. An initial value of the gap control voltage is obtained based on the voltage applied to control the etalon operation while the intensity of light received is recorded, thereby setting the etalon ET2 to a reference gap. In this way, the etalons ET1 and ET2 are independently controlled. It is preferable that one of the etalons be calibrated while the other remains still with its gap fixed.

According to FIG. 8, the image pickup unit can detect light in a wavelength range 400-490 nm in a stable manner regardless of the change in optical path length of the gaps of the etalons ET1 and ET2. When the endoscope is inserted into a patient's body, light from the illumination optical system in the wavelength range 400-490 nm is used as guide light, with the endoscope insertion end being guided to a desired observation site in a secure manner.

Color image observation is available with an endoscope that is provided with the following image pickup unit. A rotary disk 24 having a red wavelength transmission filter R, a green wavelength transmission filter G, and a blue wavelength transmission filter B positioned concentrically about a rotation axis is inserted into the optical path of the illumination optical system, and the peak transmittance wavelength of the etalon ET2 is scanned synchronously with the R, G and B filters being in the optical path. In other words, the gap of the etalon ET2 is controlled in a manner in which the etalon ET2 transmits red light while the red filter is in the optical path, green light while the green light is in the optical path, and blue light while the blue filter is in the optical path. Three color images are thus captured by the image pickup unit, in sequence, and these signals are then processed by the image signal processing circuit 54 in order to obtain a color image.

Figure 5B:
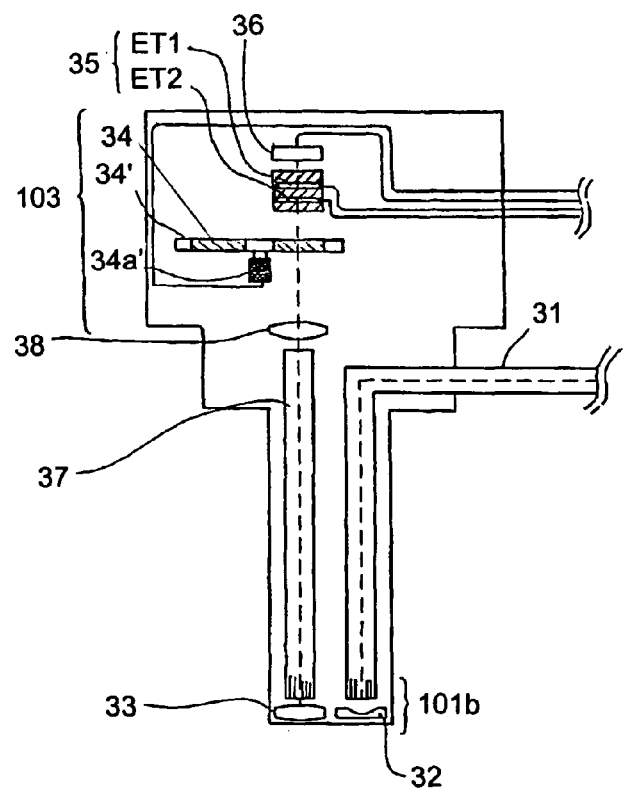

Referring to FIGS. 5(a) and 5(b), the etalon 35 (i.e., ET1 and ET2 in series) and an optical member 34 that is used to set a reference gap can be provided at a location other than the endoscope insertion end 101b. FIG. 5(b) shows a case in which they are provided in an endoscope operation part 103. In this case, the image pickup unit optically transfers an object image captured by an objective lens 33 at the insertion end 101b to the operation part 103 via a transfer optical system such as an image guide 37, and then, an image-forming optical system such as lens 38 is used to form an image on the light reception surface of the image pickup element 36. The etalon 35 and optical member 34 are provided between the image forming lens 38 and the image pickup element 36. The optical member 34 is attached to a turret 34' (together with multiple optical filters) and is removably inserted into the optical path in the image pickup unit by means of a turret rotation mechanism 34a'. The optical member 34 can be a long wavelength, bandpass filter having a boundary wavelength range G1 or a short wavelength, bandpass filter having a boundary wavelength range H1, as shown in FIGS. 4(b) and 4(c), respectively.

Figure 12A:
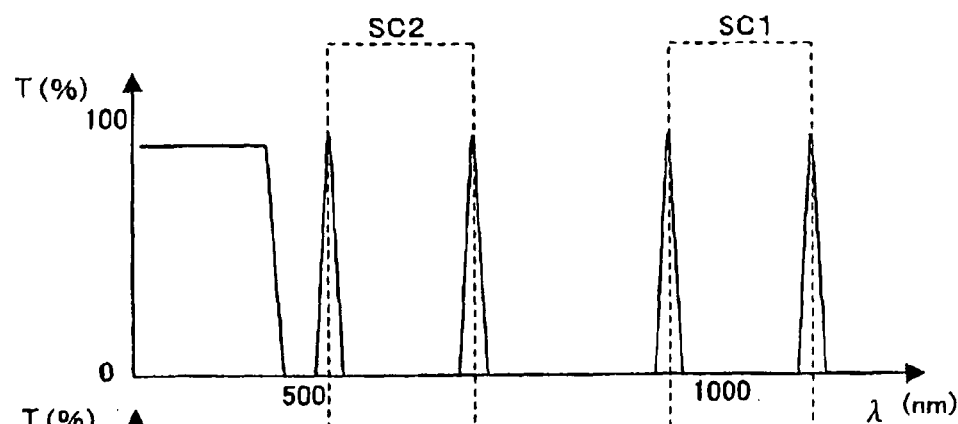
FIGS. 12(a)-12(d) relate to optical filters attached to the turret 34' mounted in the endoscope apparatus shown in FIG. 5(b), with FIG. 12(a) showing the spectral transmittance of an etalon 35 that is formed of the etalons ET1 and ET2 in series, and with FIGS. 12(b)-12(d) showing the spectral transmittance of different optical filters attached to the turret 34'.
Figure 12B:
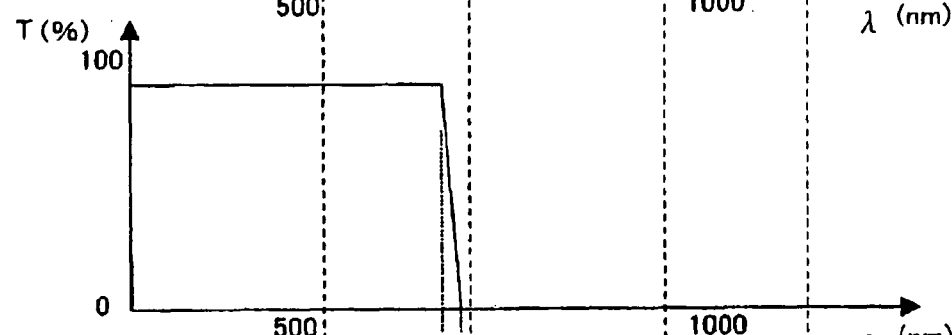
Figure 12C:
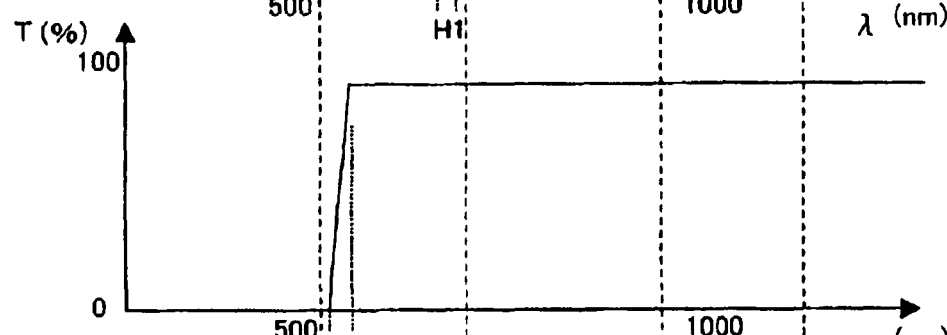
Figure 12D:
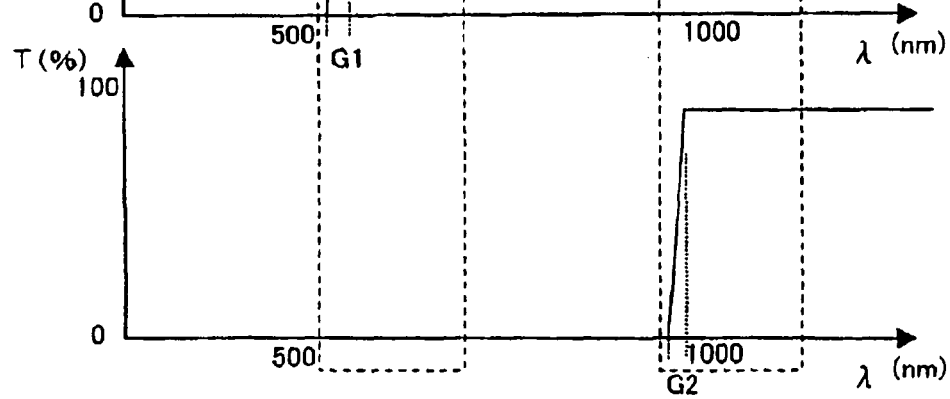

FIGS. 12(a)-12(d) relate to optical filters attached to the turret 34' mounted in the endoscope apparatus shown in FIG. 5(b), with FIG. 12(a) showing the spectral transmittance of an etalon 35 that is formed of the etalons ET1 and ET2 in series, and with FIGS. 12(b)-12(d) showing the spectral transmittance of different optical filters attached to the turret 34'. FIG. 12(a) shows the spectral transmittance of the etalon 35 and FIGS. 12(b)-12(d) show the spectral transmittance of optical filters attached to the turret 34'. In FIGS. 12(a)-12(d), SC1 is the peak transmittance scanning range of the etalon ET1 (here, in the wavelength range 930-1100 nm) and SC2 is the peak transmittance scanning range of the etalon ET2 (here, in the wavelength range 530-680 nm). The turret 34' is provided with three different optical filters having spectral transmittances as shown in FIGS. 12(b)-12(d). An optical filter having the spectral transmittance shown in FIG. 12(b) may be inserted into the optical path for color image observation using the image pickup unit. This optical filter is a short wavelength pass filter having boundary wavelength range H1, which is entirely within the peak transmittance scanning range SC2 of the etalon ET2. Before color image observations using the image pickup unit, the boundary wavelength range H1 is used to calibrate the etalon ET2 for scanning accuracy and to set the etalon ET2 to a reference gap. During color image observations, the etalon ET1 is not moved and the optical path length of its gap remains fixed.

An optical filter having the spectral transmittance shown in FIG. 12(c) may be inserted into the optical path for image observations under light of a desired wavelength in a wavelength range 530-680 nm using the image pickup unit. The optical filter is a long wavelength pass filter having a boundary wavelength range G1 that is entirely within the peak transmittance scanning range SC2 of the etalon ET2. Before image observations, the boundary wavelength range G1 is used to calibrate the etalon ET2 for scanning accuracy and to set the etalon ET2 to a reference gap. During image observation, the etalon ET1 is not moved and the optical path length of its gap remains fixed.

An optical filter having the transmittance profile shown in FIG. 12(d) may be inserted into the optical path for image observations under light of a desired wavelength in a wavelength range 930-1100 nm using the image pickup unit. The optical filter is a long wavelength pass filter having a passband in the wavelength range G2 that is entirely within the peak transmittance scanning range SC1 of the etalon ET1. Before image observations, the boundary wavelength range G2 is used to calibrate the etalon ET1 for scanning accuracy and to set the etalon ET1 to a reference gap. During image observation, the etalon ET2 is not moved, and the optical path length of its gap remains fixed.

Figure 13:
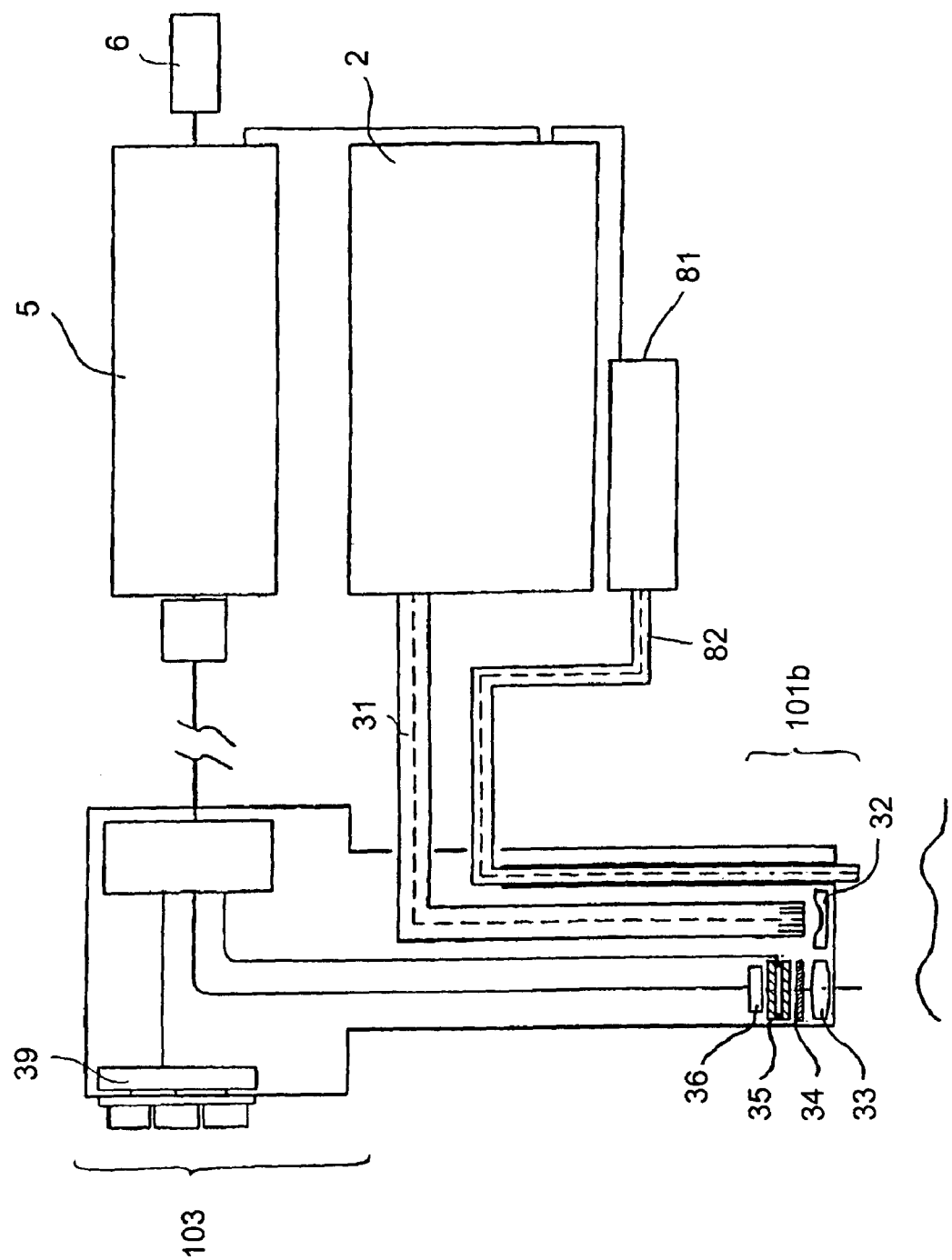
FIG. 13 shows a structure of an endoscope apparatus for detecting fluorescence from fluorescent markers.

In using an endoscope apparatus where fluorescent markers having affinity to lesions, such as a cancer, have previously been introduced into the subject's living tissue, the fluorescent markers are illuminated with excitation light, and fluorescence from the fluorescent markers that have accumulated at one or more lesions is detected, an excitation light cutoff filter and an optical member 34 that is used to set a reference gap can be combined. FIG. 13 shows the structure of an endoscope apparatus for detecting fluorescence emitted by the fluorescent markers. In FIG. 13, the light source apparatus 2 has the same structure as that shown in FIG. 9 and the processor 5 has the same structure as that shown in FIG. 1; therefore, they are not shown in detail. In this endoscope apparatus the etalon 35 and the optical member 34 for setting a reference gap are provided at the insertion end 101b. In order to excite the fluorescent markers, a light guide 82 that is coupled to a laser light source 81 is introduced into the insertion end 101b through an endoscope operation tool insert port so as to illuminate the living tissue with light from the laser light source 81. An image of the fluorescence emitted by the fluorescent markers is formed by an objective lens 33 onto the image pickup surface of the image pickup element 36. Meanwhile, the gap of the etalon 35 is changed so as to scan the peak transmittance wavelength, thereby distinctively detecting multiple fluorescent emissions having different spectral properties.

Figure 14A:
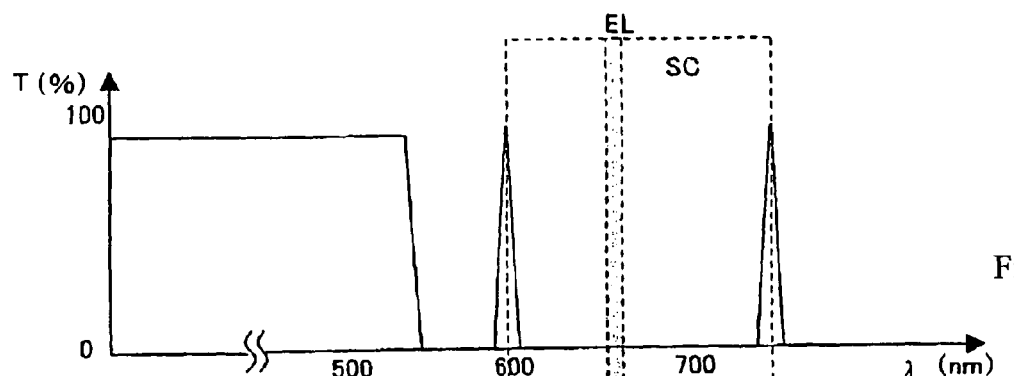
FIGS. 14(a) and 14(b) relate to an example of an optical filter used for setting a reference gap that also serves as an excitation light cutoff filter, with FIG. 14(a) showing the spectral transmittance of an etalon, and FIG. 14(b) showing the spectral transmittance of an optical filter used for setting a reference gap.
Figure 14B:
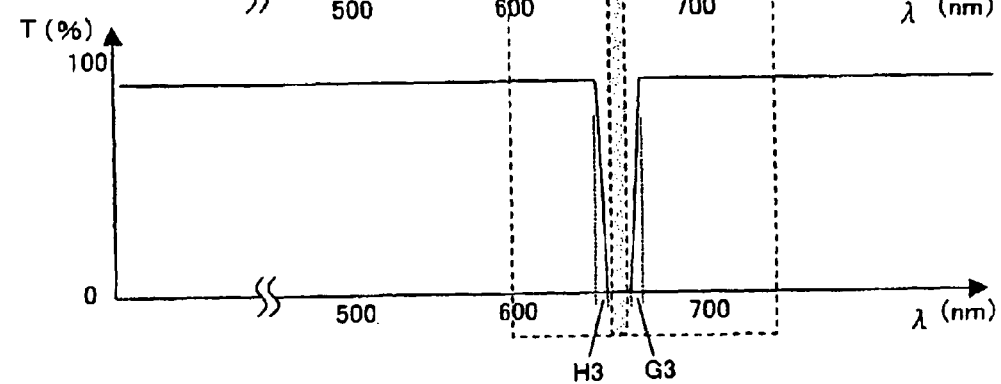

FIGS. 14(a) and 14(b) show an example of an optical filter that is used to set a reference gap also serving as an excitation light cutoff filter. In FIGS. 14(a) and 14(b), transmittance T (in %) is plotted on the ordinate and wavelength (in nm) is plotted on the abscissa. FIG. 14(a) shows the spectral transmittance of the etalon 35 and FIG. 14(b) shows the spectral transmittance of the optical member 34 that is used to set a reference gap. In FIGS. 14(a) and 14(b), SC is the peak transmittance scanning range of the etalon 35 (here, a range of 600-750 nm) and EL is the luminescence wavelength range of the laser light source 81 (here, a wavelength range 655-665 nm). The optical filter is a notch filter having boundary wavelength ranges H3 and G3 that lie entirely within the peak transmittance scanning range of the etalon 35 and have an optical density (a measure of non-transmission) of OD4 or higher for light in a wavelength range of 655-665 nm. Optical Density OD is defined as log 10 (I/I'), where I is the intensity of light entering the optical filter and I' is the intensity of light transmitted through the optical filter.

The excitation light reflected by the living tissue is cut off by the notch filter before it reaches the image pickup element 36. Before detecting fluorescence emitted by the fluorescent markers using the image pickup unit, the boundary wavelength range H3 or G3 is used to calibrate the etalon 35 for scanning accuracy and to set the etalon 35 to a reference gap.

As mentioned previously, it is desirable to set the etalon to a reference gap (i.e., to thereby calibrate the etalon for operational accuracy) after the endoscope insertion end 101b is introduced to the examination site and immediately before the peak transmittance wavelength of the etalon 35 is actually scanned. Therefore, the first control circuit 51 of the processor 5 is used to control the timing of emitting illumination light from the light source apparatus 2 through the light guide 31 and the illumination lens 32 (FIG. 13), as well as the timing of emitting illumination light from the laser light source 81 through the light guide 82 (FIG. 13). Also, the light source apparatus 2 is provided with an illumination mode to set the etalon 35 to a reference gap.

Figure 15:
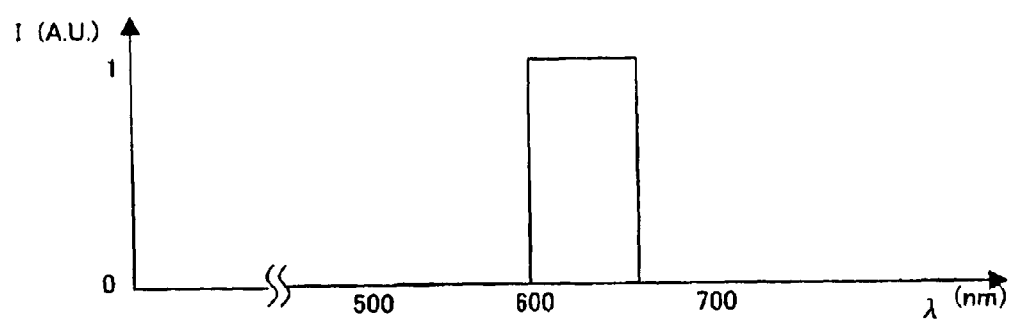
FIG. 15 is a graph of the illumination light intensity (in arbitrary units) versus wavelength λ that is used for setting the etalon whose spectral transmittance is shown in FIG. 14(a) for a reference gap.

FIG. 15 is a graph of the illumination light intensity (plotted on the ordinate, in arbitrary units) versus wavelength λ (plotted on the abscissa) that is used for setting the etalon whose spectral transmittance is as shown in FIG. 14(a) to a reference gap. The illumination light used to set the etalon 35 to a reference gap preferably has a nearly constant spectral intensity profile in the wavelength range that includes the boundary wavelength range H3 (here, the illumination light wavelength range corresponds to the wavelength range 600-660 nm).

The optical member 34 is used for setting the etalon 35 to a reference gap and thus calibrating the image pickup apparatus for operational accuracy according to a method (to be described) immediately before the peak transmittance wavelength of the etalon 35 is scanned in order to detect fluorescence from the fluorescent markers. The method is defined by the following steps:

(a) A signal for initiating the scanning of the peak transmittance wavelength of the etalon 35 in order to detect fluorescence from the fluorescent markers is sent to the first control circuit 51 of the processor 5 by, for example, the observer pushing a button at a switch part 39 in the endoscope operation part 103 (FIG. 13);

(b) An illumination mode that is used to set the etalon 35 to a reference gap is selected in the light source apparatus 2 in response to a control signal from the first control circuit 51 of the processor 5, and a region of living tissue is illuminated;

(c) Illumination light that is reflected by the living tissue enters the etalon 35 via the objective lens 33 and the optical member 34 that is used to set a reference gap. Meanwhile, the gap of the etalon 35 is changed to scan the peak transmittance wavelength in the peak transmittance scanning range SC of the etalon 35 in response to a control signal from the second control circuit 58 of the processor 5;

(d) Light transmitted through the etalon 35 is received by the image pickup element 36. The arithmetic operation circuit 57 of the processor 5 executes calculations necessary for calibrating the etalon 35 for scanning accuracy and for setting it to a reference gap, based on the intensity of light received by the light reception surface of the image pickup element 36, and updates control data for the etalon 35 stored in the memory circuit 56;

(e) The second control circuit 58 of the processor 5 reads from the memory circuit 56 the latest control data for controlling the etalon 35 and sends to the etalon 35 a control signal that causes the etalon 35 to have an optical path length equal to that of the reference gap. It also sends a signal to the first control circuit 51 to switch from the illumination mode used to set the etalon to a reference gap to the illumination mode used to excite the fluorescent markers; and (f) In response to a signal from the first control circuit 51 of the processor 5, the illumination light from the light source apparatus 2 is shut off and the illumination light from the laser light source 81 is emitted so as to illuminate the living tissue.

Alternatively, the method can be described more broadly by the following steps:

(1) in response to a control signal from the processor, the image pickup unit captures image signals while the etalon scans, at least once, over a range of wavelengths that entirely include the boundary wavelength range of the optical member;

(2) based on image signals acquired in the step (1), arithmetic operations are executed so as to determine a reference value for the optical path length of the gap of the etalon; and (3) in response to a control signal from the processor, the optical path length of the gap of the etalon is set to the reference value that was determined in step (2).

According to the above method, the etalon 35 is calibrated immediately before fluorescence from the fluorescent markers is detected, thereby ensuring stable detection of fluorescent wavelengths at any time.

Figure 16A:
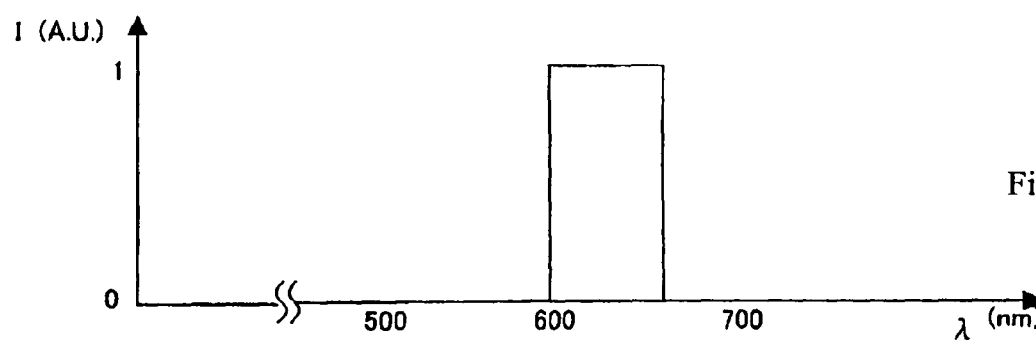
FIGS. 16(a) and 16(b) relate to illumination light emitted from the light source apparatus shown in FIG. 9 in the illumination mode for setting an etalon for a reference gap and in the illumination mode for exciting the fluorescent markers, respectively, with FIG. 16(a) showing the illumination light intensity (in arbitrary units) versus wavelength used for setting the etalon for a reference gap, and with FIG. 16(b) showing the illumination light intensity (in arbitrary units) versus wavelength used for exciting the fluorescent markers.
Figure 16B:
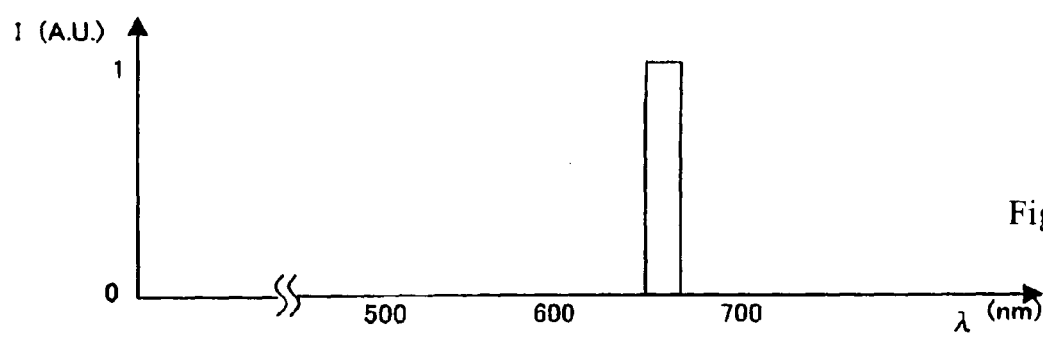
Figure 17:
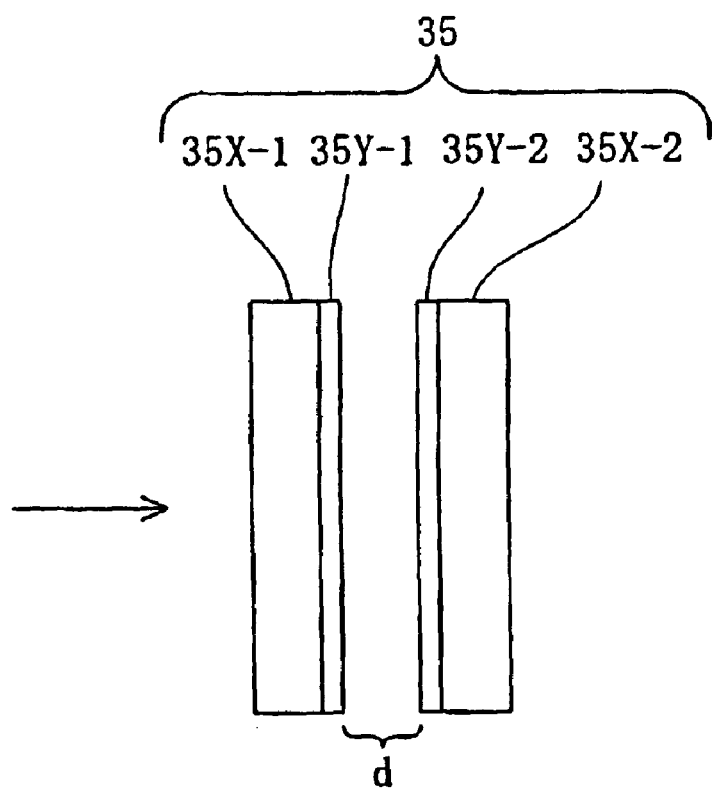
FIG. 17 is an illustration to schematically show the structure of a conventional etalon.
Figure 18:
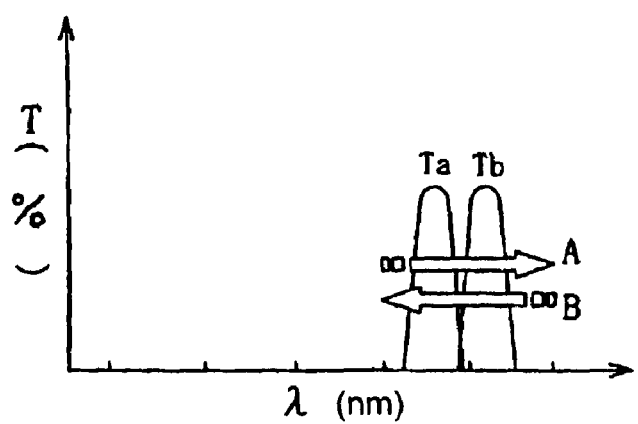
FIG. 18 is a graphical representation showing a transmittance profile of a conventional etalon.
Figure 19:
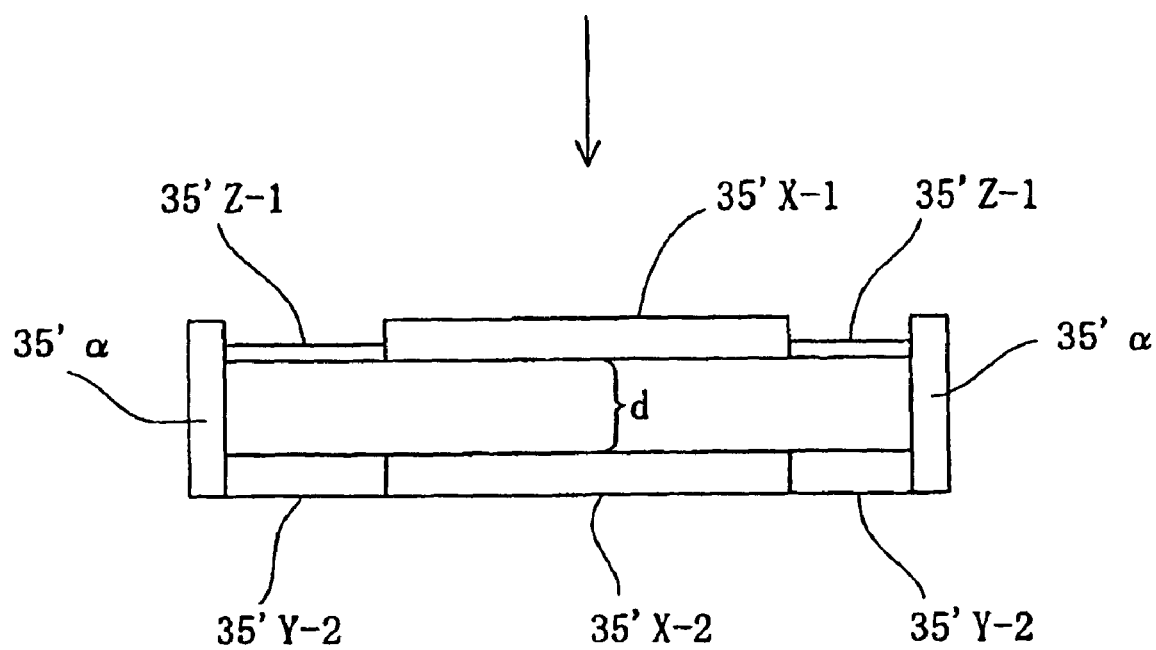
FIG. 19 is an illustration to schematically show a structure of a conventional small etalon.

FIG. 16(a) shows the spectral intensity profile of illumination light for setting the etalon to a reference gap, and FIG. 16(b) shows the spectral intensity profile of illumination light for exciting the fluorescent markers. In FIGS. 16(a) and 16(b), the intensity I is plotted on the ordinate in arbitrary units and the wavelength λ (in nm) is plotted on the abscissa. As shown in FIG. 16(a), the illumination light for setting the etalon to a reference gap has a substantially constant intensity in the wavelength range of 600-660 nm. The illumination light for exciting the fluorescent markers has a substantially constant intensity in the wavelength range of 655-665 nm.

The invention being thus described, it will be obvious that the same may be varied in many ways. For example, the etalon may be set to a reference gap (and thus calibrated for operational accuracy) according to the above process only when the endoscope operator initiates the method. Also, the illumination light used to excite the fluorescent markers can be generated by the light source apparatus 2. In such a case, the light source apparatus 2 must have at least two illumination modes, one for setting the etalon to a reference gap and one for exciting the fluorescent markers, and will emit illumination lights having spectral intensity profiles similar to that shown in FIGS. 16(a) and 16(b), respectively. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An etalon calibration procedure for use in an image pickup apparatus, said image pickup apparatus being an endoscope having an insertion end that is inserted within a patient in order to diagnose the presence of disease in living tissue, and said endoscope detects fluorescence emitted from a fluorescent marker under the illumination of excitation light, the fluorescent marker having been previously introduced into a subject's living tissue, said image pickup apparatus comprising:

an image pickup unit that includes
an objective optical system having multiple optical surfaces for forming an image of an object;
an image pickup element, having an image pickup surface, for converting said image to image signals;
an etalon that is located between the most object-side optical surface of the objective optical system and the image pickup surface and having a gap, the optical path length of the gap being controllable for scanning the wavelengths of light transmitted by the etalon, thereby selecting the wavelengths of the light that reach the image pickup surface;
an optical member that is located between the most object-side surface of the objective optical system and the image pickup surface, said optical member having a first wavelength range in which incident light is reflected, a second wavelength range in which incident light is transmitted, and a boundary wavelength range that is bounded at one end by the first wavelength range and at the other end by the second wavelength range, the boundary wavelength range being entirely within the range over which the etalon scans the wavelengths of light transmitted by the etalon; and
a processor coupled to the image pickup unit that includes a circuit for controlling the operation of the etalon and a circuit for executing arithmetic operations based on image data obtained by the image pickup unit;
said etalon calibration procedure is performed after the insertion end of the endoscope reaches a site of the living tissue to be examined and includes the following steps:
(1) in response to a control signal from the processor, the image pickup unit captures image signals while the etalon scans, at least once, over a range of wavelengths 600-750 nm that entirely include the boundary wavelength range of the optical member;
(2) based on image signals acquired in the step (1), arithmetic operations are executed so as to determine a reference value for the optical path length of the gap of the etalon; and
(3) in response to a control signal from the processor, the optical path length of the gap of the etalon is set to the reference value that was determined in step (2).

2. The etalon calibration procedure as set forth in claim 1, wherein said steps (1) to (3) are performed immediately before the peak transmittance wavelengths of the etalon are scanned.

3. A method of calibrating an image pickup apparatus of an endoscope having an insertion end that is inserted within a patient in order to diagnose the presence of disease in living tissue, said image pickup apparatus comprising:

an image pickup unit that includes
an objective optical system having multiple optical surfaces for forming an image of an object;
an image pickup element, having an image pickup surface, for converting said image to image signals;
an etalon, which is located between the most object-side optical surface of the objective optical system and the image pickup surface, that has a gap, the optical path length of the gap being controllable for scanning the peak wavelengths of light transmitted by the etalon over a range of wavelengths from 600-750 nm, thereby selecting the wavelengths of the light that reach the image pickup surface;
an optical member that is located between the most object-side surface of the objective optical system and the image pickup surface, said optical member having a first wavelength range in which incident light is reflected, a second wavelength range in which incident light is transmitted, and a boundary wavelength range that is bounded at one end by the first wavelength range and at the other end by the second wavelength range, the boundary wavelength range being entirely within the range over which the etalon scans the peak wavelengths of light transmitted by the etalon; and
a processor coupled to the image pickup unit that includes a circuit for controlling the operation of the etalon and a circuit for executing arithmetic operations based on image data obtained by the image pickup unit;
said method of calibrating including the following steps:
(1) after the insertion end of the endoscope reaches a site of the living tissue to be examined, in response to a control signal from the processor, the image pickup unit captures image signals while the etalon scans, at least once, over a range of peak wavelengths from 600 to 750 nm;
(2) based on image signals acquired in the step (1), arithmetic operations are executed so as to determine a reference value for the optical path length of the gap of the etalon; and
(3) in response to a control signal from the processor, the optical path length of the gap of the etalon is set to the reference value that was determined in step (2).

4. The method of calibrating an image pickup apparatus of an endoscope as set forth in claim 3, wherein said steps (1) to (3) are performed immediately before the peak transmittance wavelengths of the etalon are scanned.

* * * * *